United States Patent [19]

Roetling

[11] Patent Number: 4,630,125
[45] Date of Patent: Dec. 16, 1986

[54] UNSCREENING OF STORED DIGITAL HALFTONE IMAGES

[75] Inventor: Paul G. Roetling, Ontario, N.Y.

[73] Assignee: Xerox Corporation, Stamford, Conn.

[21] Appl. No.: 500,128

[22] Filed: Jun. 1, 1983

[51] Int. Cl.$^4$ ............................................... H04N 1/40
[52] U.S. Cl. ...................................... 358/280; 358/283
[58] Field of Search ....................... 358/280, 283, 298; 382/50, 52, 53

[56] References Cited

U.S. PATENT DOCUMENTS

| | | | |
|---|---|---|---|
| 3,977,007 | 8/1976 | Berry et al. | 346/1 |
| 4,084,196 | 4/1978 | Tisue et al. | 358/283 |
| 4,144,547 | 3/1979 | Stoffel | 358/260 |
| 4,194,221 | 3/1980 | Stoffel | 358/283 |
| 4,210,936 | 7/1980 | Cinque et al. | 358/283 |
| 4,214,277 | 7/1980 | Urich | 358/283 |
| 4,328,426 | 5/1982 | D'Ortemzio | 358/280 |
| 4,389,677 | 6/1983 | Rushby et al. | 358/280 |
| 4,403,257 | 9/1983 | Hsieh | 358/280 |

Primary Examiner—Edward L. Coles, Jr.

[57] ABSTRACT

A method of reconstructing a continuous tone image of greyscale values that have been converted to a halftone image of black and white spots. The conversion to the digital halftone image spots was by comparing each pixel of the continuous tone greyscale image to a periodic screen pattern and providing either a black or white spot based on the comparison. In particular, to reconstruct the continuous tone greyscale image from the halftone image, each spot of the halftone image is isolated along with a neighborhood of surrounding spots. For each neighborhood, the maximum screen pattern value producing a white spot is compared to the minimum screen value producing a black spot. If the minimum screen value giving a black spot is greater than the maximum screen value giving a white spot, then the greyscale pixel value of the isolated spot is the average of the maximum and minimum screen values. If the minimum screen value giving a black spot is less than the maximum screen value giving a white spot, then the process is repeated after deleting that portion of the neighborhood of surrounding spots containing the maximum or minimum screen value furthest from the isolated spot.

19 Claims, 5 Drawing Figures

UNSCREENING OF STORED DIGITAL HALFTONE IMAGES

This invention relates to a system for processing images and more particularly to a method for obtaining a continuous tone image from a stored digital halftone image.

A typical black and white image on photographic film comprises various grey levels of light. That is, different amounts of light are reflected from various spots of the image on the film, providing what is known as a continuous tone photographic image. It is known in the prior art to be able to digitize the greyscale continuous tone photographic image. That is, each pixel or spot of the photographic image is assigned a number representing the amount of light or grey level of that particular spot. Typically an eight bit word is used, giving 256 possible grey levels of light. The digitized image is known as a continuous tone digital image and it is possible by use of photographic film to go back and forth between the analog and digital images with a reasonable reproduction.

It is also known to put an image on paper rather than on photographic film. For example, a modulated laser can be used to scan a xerographic drum to give a series of black and white spots (the spots corresponding to turning the laser on and off). The image on the drum is then developed and transferred to a copy sheet. This process of developing black and white spots will not give a continuous tone image.

It is possible, however, to give the impression of a continuous tone image by using a process known as halftoning. The halftone process uses a mathematically stored screen pattern, for example an almost sinusoidal, two dimensional pattern. The process converts the original or continuous tone image into an image of black and white spots that "appears" to be continuous tone. This process is accomplished by systematically comparing each pixel continuous tone value with the value of the screen. If the continuous tone value of the pixel is greater than the screen value, then a white spot is produced. On the other hand, if the pixel value is less than the screen value, a black spot is produced. It should be understood that the pixel values are the 8 bit grey level values for each spot of the original picture.

In effect, this procedure converts grey into black and white spots, but gives the impression of a grey level by producing more white spots for a whiter area and more black spots for a blacker area. Although a true continuous tone image is not produced by this procedure, the procedure has two advantages. The first advantage is that each spot of the image is described with one bit rather than an eight bit word for each grey level pixel value in the original continuous tone picture. This allows the halftone image to be stored with approximately ⅛ of the storage of the original continuous tone image. Another advantage of this halftone system is that, in fact, a halftone image can be printed on paper. In short, the conversion takes each eight bit pixel representing a greyscale value, compares the pixel to a screen value and provides either a zero (0) or one (1) to modulate the laser. This image can then be printed on paper.

If all that is required is the printing of this stored halftone image, then there is no difficulty. A problem exists, however, if it is necessary to modify the image, for example, to magnify or to change the tone scale. It is then necessary to go back to the original continuous tone image, with the eight bit words representing the greyscale of each pixel, to make the modification. Often times, this original image requiring eight times the storage capacity of the stored halftone image is no longer available.

It should be appreciated that it is impossible to exactly reverse the process of halftoning because information has been lost. Nevertheless, just as the halftone gives the visual impression of grey, we should be able to approximate the continuous tone image by a reconstruction method.

A partial solution known in the art is to spatially filter the halftone image with a low pass filter. This averages out the halftone screen and yields a reconstructed continuous tone image. The reconstructed image however, gives a blurred image without sharp lines. Accordingly, it would be desirable to be able to provide a method to modify a halftone image while still maintaining a relatively sharp image.

It is an object of the invention, therefore, to provide a new and improved halftone image manipulation technique. It is still a further object of the present invention to provide a new and improved method for unscreening a halftone screened digital image. Further advantages of the present invention will become apparent as the following description proceeds, and the features characterizing the invention will be pointed out with particularity in the claims annexed to and forming a part of this specification.

Briefly, the present invention is a method of reconstructing a continuous tone image of greyscale values that have been converted to a halftone image of black and white spots. The conversion to the digital halftone image spots was by comparing each pixel of the continuous tone greyscale image to a periodic screen pattern and providing either a black or white spot based on the comparison. In particular, to reconstruct the continuous tone greyscale image from the halftone image, each spot of the halftone image is isolated along with a neighborhood of surrounding spots. For each neighborhood, the maximum screen pattern value producing a white spot is compared to the minimum screen value producing a black spot. If the minimum screen value giving a black spot is greater than the maximum screen value giving a white spot, then the greyscale pixel value of the isolated spot is the average of the maximum and minimum screen values just described. If the minimum screen value giving a black spot is less than the maximum screen value giving a white spot, then the process is repeated after deleting that portion of the neighborhood of surrounding spots containing the maximum or minimum screen value furthest from the isolated spot.

For a better understanding of the present invention, reference may be had to the accompanying drawings wherein the same reference numerals have been applied to like parts and wherein.

Figure 1:
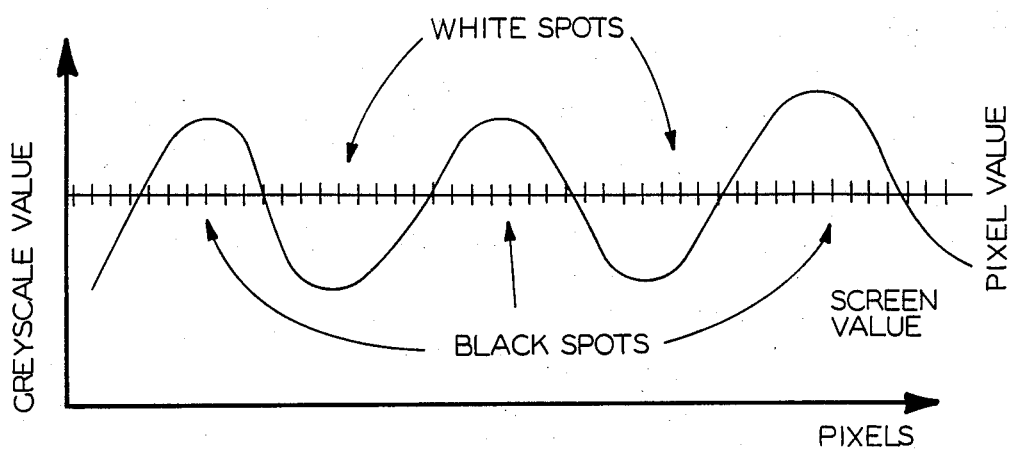
FIG. 1 illustrates a one dimensional screen for halftoning digital images.

With reference to FIG. 1, there is an illustration of the halftoning of a continuous tone digital image. Each pixel of the original digital image has a greyscale value represented by an 8 bit digital word. The greyscale values are represented along the ordinate or y axis of the figure. For purposes of illustration, all the pixels are assumed to have the same greyscale value as indicated by the horizontal line labeled "pixel value". Note that screens usually vary in two dimensions, a one dimension screen being shown for clarity only.

The halftone screen is exemplified by the approximate sinewave labeled "screen value". The process of halftoning merely compares the greyscale value of a pixel with the corresponding value of the halftone screen. If the greyscale value of a particular pixel is greater than the associated screen value, then the corresponding spot on the halftone image is white. On the other hand, if the greyscale value of a particular pixel is less than the associated screen value, the corresponding spot on the halftone image is black.

Thus, in the FIG. 1 illustration, all the pixels under the positive half cycles of the wave yield black spots since the screen values relative to these pixels are greater than the pixel values. On the other hand, all of the pixels above the negative half cycles of the wave yield white spots since the screen values relative to these pixels are less than the pixel values. In this manner, a continuous tone greyscale image is converted to a half tone image. It should also be noted that in converting to a half tone image, only one bit is required instead of the 8 bit greyscale value. That is, a black or white spot is represented by either 0 or 1.

In accordance with the present invention, to descreen the halftone pixel, it is necessary to determine the pixel value before screening. It should be understood that it is well known to store and compare screen values with associated pixel values. Thus, if the halftone pixel is white, the pixel value before screening is known to be greater than the value of the screen, for that particular pixel. On the other hand, if the halftone pixel is black, the pixel value before screening is known to be less than the value of the screen during the screening process. To determine the pixel value before descreening, it is necessary to focus on each halftone pixel and the surrounding region of pixels. Preferably, the surrounding region is the number of pixels covered in one screen cycle, for example a 7×7 matrix of pixels.

Looking at the region around the center pixel, the first step in the process is to determine the biggest screen value that still gives a white pixel. In other words, of all the screen values that gave a white pixel, one of the screen values is highest. Then the minimum screen value is determined that still gave a black pixel. In other words, of all the screen values that gave a black pixel, there is a minimum screen value.

Figure 2:
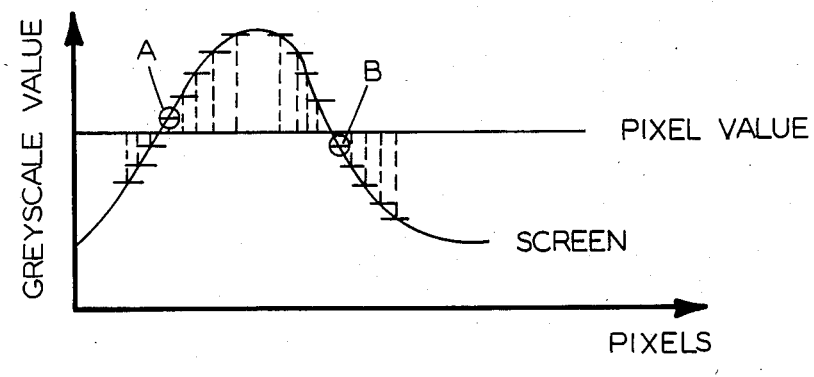
FIG. 2 represents a pixel screen relationship in accordance with the present invention.

Having determined the maximum screen value that still gave a white pixel (MAX. SV→WHITE) and the minimum screen value that still gave a black pixel (MIN. SV→BLACK), two conditions exist. The first condition results if the minimum screen value that gave a black pixel is greater than the maximum screen value that gave a white pixel. That is, if the (MIN SV→BLACK)>(MAX SV→WHITE), then the greyscale value of the center pixel is assigned the average value of the maximum screen value giving white and the minimum screen value giving black. That is $G_{cp}$=AVE(MAX SV→WHITE, MIN SV→BLACK)

where $G_{cp}$ is the greyscale value of the center pixel. This is illustrated in FIG. 2. The approximate sinusoidal wave in FIG. 2 represents one dimensional screen values and the solid line in the direction of the X axis represents uniform pixel values. Any pixel that corresponds to a screen value on the positive part of the cycle of the screen pattern results in a black pixel. The minimum screen value resulting in a black pixel is, therefore, necessarily located slightly above the constant pixel value line. The minimum screen value is represented by A in FIG. 2.

In a similar manner, any pixel that corresponds to a screen value on the negative part of the cycle of the screen pattern results in a white pixel. The maximum screen value resulting in a white pixel is, therefore, necessarily located slightly below the constant pixel value line. The maximum screen value is represented by B in FIG. 2. With this condition, it is obvious that the pixel value before screening is approximately the average of the minimum screen value giving black and the maximum screen value giving white. Note that in this condition it is consistent, though not necessarily true, to assume that pixels in this region were a constant value.

Figure 3:
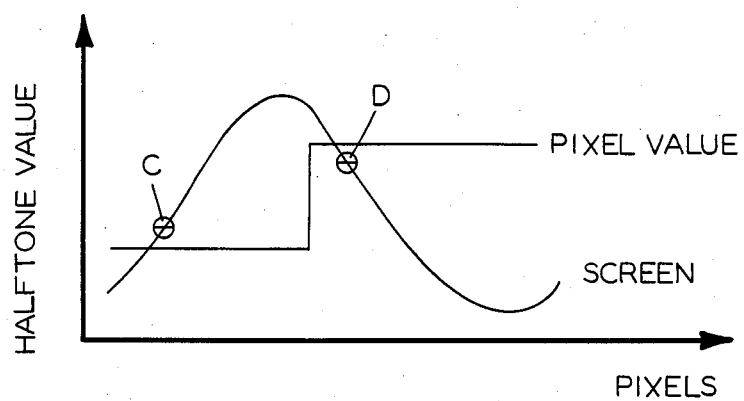
FIG. 3 represents another pixel screen value relationship in accordance with the present invention.

The second condition is that in which the minimum screen value giving black is less than the maximum screen value giving white. That is, if the (MIN SV→BLACK)<(MAX SV→WHITE), then the region or neighborhood pixels about the center pixel are definitely known to not have the same constant value. There is probably within the region an abrupt transition of greyscale values. This is illustrated in FIG. 3. In particular, the minimum screen value giving black is shown at C. The screen value gives black at location C because the screen value is greater than the pixel value at C as illustrated. As in FIG. 2, the screen pattern is shown as an approximately sinusoidal wave.

However, it has been assumed that the maximum screen value giving white is greater than the minimum screen value giving black. Therefore, for the maximum screen value giving white to be greater than the minimum screen value giving black, the maximum screen value giving white must be as somewhere above C, illustrated at D. The pixel is white because the pixel value is greater than the screen value at D. Therefore, along the screen, it is known that there was a transition of pixel values from below the value of the screen at C to above the value of the screen at D as illustrated by the pixel value step function in FIG. 3. It should be noted that the step function is for illustrative purposes only and any function is appropriate that demonstrates a transition of pixel values.

Thus, if the minimum screen value giving black is less than the maximum screen value giving white, it is known that pixel values before screening are not constant within the region or neighborhood about the center pixel. In the situation that the pixel values are determined not to be constant, at least one additional step is required to determine the pixel value before screening. In this situation, either the pixel whose minimum screen value gives black or the pixel whose maximum screen value gives white is furthest away from the center pixel.

Figure 4:
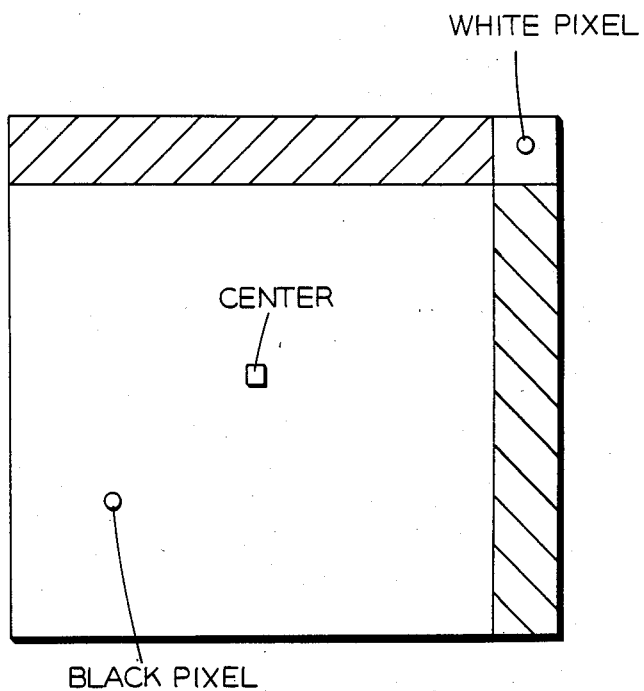
FIG. 4 illustrates the deletion of a portion of the neighborhood about a pixel in accordance with the present invention.

Assume that the furthest pixel from the center pixel is that pixel whose maximum screen value gives white, or as illustrated in FIG. 4. The next step is to eliminate from analysis the column and row of pixels containing the white pixel as illustrated by the shaded areas and any area beyond that row and column. A smaller neighborhood or matrix of pixels remains. The same analysis is run again with the remaining pixels. In other words, a new maximum screen value that gives white is found as well as the minimum screen value that gives black in this smaller neighborhood.

If, during this second analysis, the minimum screen value that gives black is greater than the maximum screen value that gives white, the first condition is recognized, as illustrated in FIG. 2. That is, the pixel greyscale value is approximately equal to the average of the minimum screen value giving black and the maximum screen value giving white. If this condition is not true, but rather the minimum screen value giving black is less than the maximum screen value giving white as illustrated in FIG. 3, the neighborhood surrounding the pixel again must be reduced.

In other words, the minimum screen value giving black and the maximum screen value giving white are again analyzed to determine which of the pixels corresponding to these screen values is furthest away from the center pixel. The pixel that is furthest from the center pixel is again deleted along with the pixels in the row and column inhabited by this pixel and those beyond. Again, the new smaller neighborhood around the center pixel is reexamined as before and the process is continued until finally the minimum screen value that gives black is greater than the maximum screen value that gives white.

It will then be determined that the greyscale value of the center pixel or the pixel under consideration is the average of the minimum screen value giving black and the maximum screen value giving white. In this manner the original greyscale value of each of the screened pixels can be determined, in effect giving the unscreened greyscale values of the screened image. Thus, the screened image or stored halftone image will have been reconverted to an unscreened greyscale image. This procedure is illustrated in the flow chart in FIG. 5 and a preferred implementation of the procedure is illustrated in Appendix A.

Figure 5:
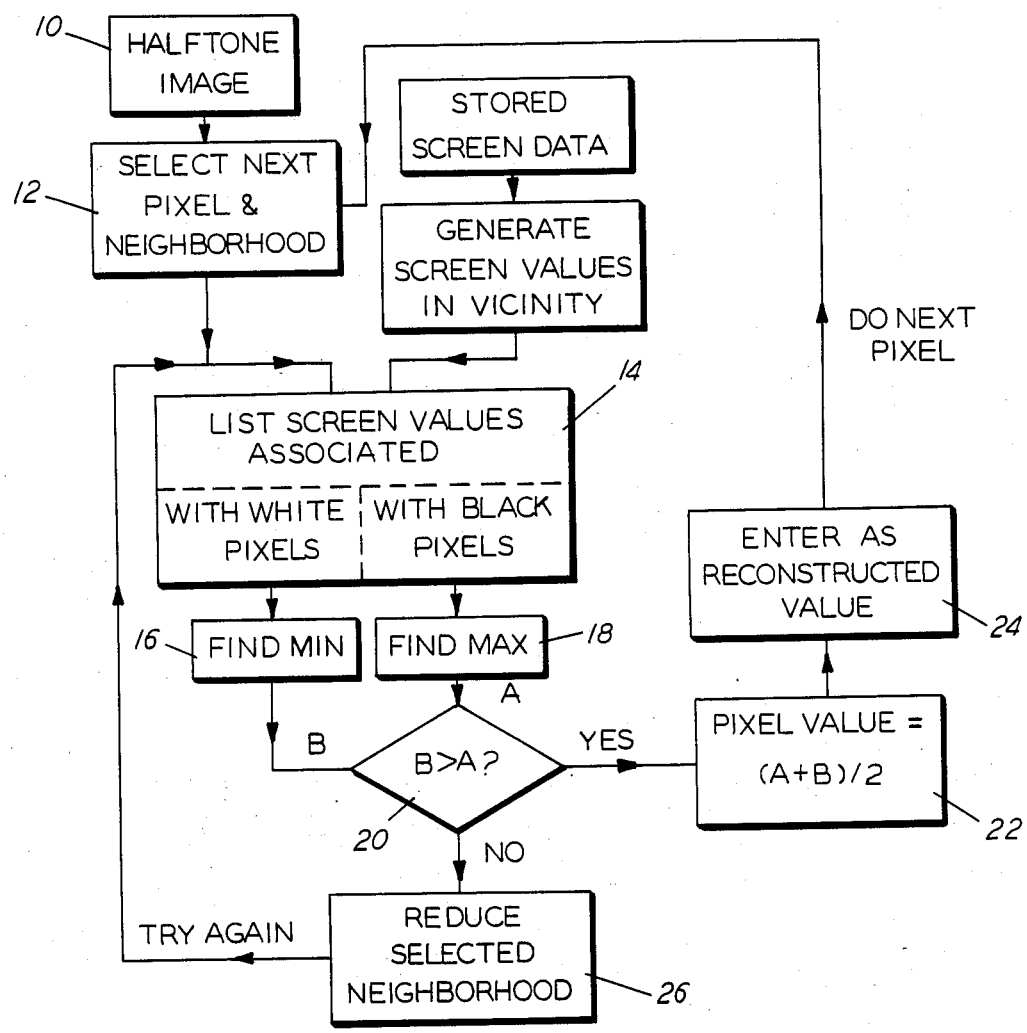
FIG. 5 is a flow chart illustrating the technique of descreening in accordance with the present invention.

With reference to FIG. 5, block 10 represents the storage of the halftone image. According to the present invention, a pixel and surrounding neighborhood is selected as shown in block 12. The process of determining the screen values giving white pixels and the screen values giving black pixels is illustrated in block 14 with separate sections for white pixel values and black pixel values.

In accordance with the present invention, two screen values are then determined, the minimum screen value giving a white pixel (block 16) and the maximum screen value giving a black pixel (block 18). The decision block 20 represents the determination of the relative values of blocks 16 and 18.

If the minimum screen value giving a white pixel is greater than the maximum screen value giving a black pixel, then the pixel value is assumed to be the average of the two screen values as shown in block 22. The pixel value is then entered as the reconstructed value of the selected halftone image pixel (block 24). A new pixel and surrounding neighborhood are selected (block 12) and the process continues.

If, on the other hand, the minimum screen value giving a white pixel is not greater than the maximum screen value giving a black pixel, then the neighborhood around the selected pixel must be reduced (block 26). The process of finding a minimum screen value giving a white pixel and a maximum screen value giving a black is repeated (blocks 14, 16, 18). If the minimum screen value giving a white pixel is still not greater than the maximum screen value giving a black pixel, the neighborhood around the selected pixel is again reduced.

There will finally be a reduced neighborhood about the selected pixel that will yield the minimum screen value giving white to be greater than the maximum screen value giving black. At this point, the pixel value of the selected pixel is assumed to be the average of the two screen values (block 22). The procedure continues until all the pixels have been given reconstructed values.

While there has been illustrated and described what is at present considered to be a preferred embodiment of the present invention, it will be appreciated that numerous changes and modifications are likely to occur to those skilled in the art, and it is intended in the appended claims to cover all these changes and modifications which fall within the true spirit and scope of the present invention.

APPENDIX A

```
Zero(AreaIn,length)

// Next do it.
ContFromHT(bits1in,bitsout)
LineVal = 0
ShiftVal = 0

CloseAISWindow(Window1In)
CloseAISWindow(WindowOut)

strings!message = "Just finished case shown above"
```

```
goto NEWMENU
]

and TestaFile(file,InorOut,readorwrite,raster,lvbitlength) = valof [ let rasterval,counter = nil,nil if InorOut eq outfile do ChangeSelection(0,lv neworold)

unless (strings!InorOut) & (strings!InorOut)>>STRING.length do
    [ strings!message = "Please enter file name."
        resultis 0 ]
if InorOut eq outfile do ChangeSelection(new,lv neworold)
unless file do
    [ file = OpenAISFile(strings!InorOut,readorwrite,raster) ]
if (file eq 0) & (InorOut ne outfile) do
    [ strings!message = "Failed to open input file."
        resultis 0 ]

unless file do [ resultis 0 ]
//File open here if InorOut eq outfile do ChangeSelection(old,lv neworold)

@lvbitlength = 8
unless raster>>RPART.bitsperSample eq 8 do
    [ test raster>>RPART.bitsperSample eq 1
            ifso [ @lvbitlength = 1 ]
            ifnot [ strings!message = "Not an 8 or 1 bit/pixel file"
            CloseAISFile(file)
            resultis 0 ]
    ]
counter = InorOut +5
let rasterval = raster>>RPART.scanLength
StringFromNum(counter,rasterval,0)
rasterval = raster>>RPART.scanCount
StringFromNum(counter+1,rasterval,0)

resultis file

]

and DoCheck(raster1In,rasterOut,bitsout) be [

WinSizer(WinVec1In,Pix1In,infile1)
WinSizer(WinVecOut,PixOut,outfile)
CheckWindow(WinVec1In,Pix1In,raster1In)
CheckWindow(WinVecOut,PixOut,rasterOut)
SetWindowValues(WinVec1In,infile1)
SetWindowValues(WinVecOut,outfile)
MatchWindows(raster1In,rasterOut)

]

and ContFromHT(bits1in,bitsout) be [

//Expects to find windows already open on AIS files &
//  vectors with windowparameters available.
```

```
let v = vec 6; PackArgs = v
let v = vec 5; UnpackArgs1 = v
let v = vec 1; Pack = v
let v = vec 1; Unpack1 = v
let v = vec 169; Distances = v      //Space for up to 13 Lines
let v = vec 169; UsePixels = v
let wrd1In = IntDivide(XlengthIn,16/bits1in)
let wrdOut = IntDivide(XlengthOut,16/bitsout)
PackArgs = PackArgs + (PackArgs & 1)
UnpackArgs1 = UnpackArgs1 + (UnpackArgs1 & 1)

Lines = Lines -1
buffer = Lines*XlengthIn
let YHalf = Lines/2
let OutPtr = AreaIn + buffer
let InPtr = OutPtr - XlengthIn
let YOut = AreaIn + YHalf*XlengthIn
let startline = nil
let Pixel = nil PackArgs!0 = OutPtr
PackArgs!1 = OutPtr
PackArgs!2 = wrdOut
PackArgs!3 = XlengthIn
PackArgs!4 = bkgnd
PackArgs!5 = 128
UnpackArgs1!0 = InPtr
UnpackArgs1!1 = InPtr
UnpackArgs1!2 = XlengthIn test (bits1in eq 1) ifso [ @Unpack1 = DispatchMu+4 ]
                   ifnot [ @Unpack1 = DispatchMu+2 ]
test (bitsout eq 1) ifso [ @Pack = DispatchMu+3 ]
                    ifnot [ @Pack = DispatchMu+1 ]

//Setup distances from center for pixels
SetUpDistances()
SpotSize = Lines*Lines-1
//First initialize array with beginning of pix
for Y = 1 to (Lines +1)/2 do
    [
    startline = AreaIn - XlengthIn
    for n = 0 to (Lines -2) do
        [
        startline = startline + XlengthIn
        MoveBlock(startline,startline+XlengthIn,XlengthIn)
        ]
    ScreenLine(OutPtr,XlengthIn)
    ReadAISScanLine(Window1In,-1,XlengthIn,InPtr)
    Unpack1(UnpackArgs1)
    ScreenCoder(InPtr,OutPtr)      //Mixes screen & pix
    ]
[   //Start main loop.

//Scan lines are set up in array
//Convert one line to continuous-tone for X = 0 to XlengthIn-1 do
    [
    Pixel = FixaPixel(AreaIn,X)
```

```
    OutPtr!X = Pixel
    ]

//Pack 1 line & write it out
    Pack(PackArgs)
    WriteAISScanLine(WindowOut,-1,XlengthIn,OutPtr)

//Move up data & read in more
    startline = AreaIn - XlengthIn
    for n = 0 to (Lines -2) do
        [
        startline = startline + XlengthIn
    MoveBlock(startline,startline + XlengthIn,XlengthIn)
        ]
    test EndofAISWindow(Window1In)
        ifso [ Zero(InPtr,XlengthIn) ]

ifnot
        [
        ScreenLine(OutPtr,XlengthIn)
        ReadAISScanLine(Window1In,-1,XlengthIn,InPtr)
        Unpack1(UnpackArgs1)
        ScreenCoder(InPtr,OutPtr)      //Mixes screen & pix
        ]

//And cycle back unless finished.
if EndofAISWindow(WindowOut) do break

] repeat   //End main loop.
]

and ScreenCoder(PixPtr,ScreenPtr) be [
//Mixes screen & pix to get max/min limits
//Turns 1 bits into negative of screen value
//Turns 0 bits into screen value
//Overwrites pixels with coded values for x = 0 to (XlengthIn -1) do
    [
    test (PixPtr!x eq 0)
        ifso  [ PixPtr!x =   ScreenPtr!x ]
        ifnot [ PixPtr!x = - ScreenPtr!x ]
    ]
]

and FixaPixel(LinePtr,Xloc) = valof [ let LHalf = Lines/2
let XB = Xloc - LHalf
let XT = XB + Lines -1 -XlengthIn
let YB,YT,Xcut,Ycut = nil,nil,nil,nil
let MaxWhitePos = nil
let MinBlackPos = nil
```

```
let MinBlack = nil
let MaxWhite = nil
let PartDot = false
let LimitPos = nil //Move section of pix into UsePixels array
//& set = 0 outside pix
let UseLine = UsePixels
LinePtr = LinePtr + XB
for y = 0 to (Lines -1) do
    [
    MoveBlock(UseLine,LinePtr,Lines)
    if (XB ls 0) do Zero(UseLine,(-XB))
    UseLine = UseLine + Lines
    if (XT gr 0) do Zero((UseLine-XT),XT)
    LinePtr = LinePtr + XlengthIn
    ]

[   //Loop to eliminate part dot conflicts
MinBlack = 255
MaxWhite = 0 for z = 0 to SpotSize do
    [
    unless UsePixels!z do loop
    test (UsePixels!z gr 0)
        ifso [
            if (UsePixels!z ls MinBlack) do
                [
                MinBlack = UsePixels!z
                MinBlackPos = z
                ]
            ]
        ifnot [
            if ((-UsePixels!z) gr MaxWhite) do
                [
                MaxWhite = -UsePixels!z
                MaxWhitePos = z
                ]
            ]
    ]   //End of z loop //Next see if result is a partial dot
//    Setup to recognize different methods:
//    MethodTyper eq 0 = "Do partial dots"
//    MethodTyper eq 1 = "Do full dots only"
//    MethodTyper eq 2 = "Do full dot mask"

test (MinBlack gr MaxWhite)
    ifso [   //fulldot over area used
         if MethodTyper eq 2 do resultis 255
         unless PartDot do
             [
             if (MinBlack eq 255) do resultis 255
             if (MaxWhite eq 0) do resultis 0
             ]
         resultis ((MinBlack + MaxWhite) rshift 1)
         ]
```

```
        ifnot [   //partial dot
              PartDot = true
              if MethodTyper gr 0 do resultis 0
        //Identify which limit is further out
              test (Distances!MinBlackPos gr Distances!MaxWhitePos)
                  ifso  LimitPos = MinBlackPos
                  ifnot LimitPos = MaxWhitePos //Now cut out region away from outer limit
              XB = 0; YB = 0; XT = Lines-1; YT = XT
              Xcut = LimitPos rem Lines; Ycut = LimitPos/Lines
              if (Xcut gr LHalf) do XB = Xcut
              if (Xcut ls LHalf) do XT = Xcut
              if (Ycut gr LHalf) do YB = Ycut
              if (Ycut ls LHalf) do YT = Ycut
              UseLine = UsePixels + XB + Lines*YB
              XT = XT-XB + 1
              for y = YB to YT do
                  [
                  Zero(UseLine,XT)
                  UseLine = UseLine + Lines
                  ]
              ]
] repeat
]

and SetUpDistances() be [ let Center = Lines/2
let dx,dy = nil,nil
let z = 0 for y = 0 to (Lines-1) do
    [
    for x = 0 to (Lines-1) do
        [
        dx = x-Center
        dy = y-Center
        Distances!z = dx*dx + dy*dy
        z = z + 1
        ]
    ]
]

and MatchWindows(rasterIn,rasterOut) be [

// Set input & output windows to match the smaller one.

unless Pix1In do return   //Ignore unless input file exists.

XlengthIn = NumFromString(strings!inwind1xl,0)
YlengthIn = NumFromString(strings!inwind1yl,0)
XlengthOut = 0
YlengthOut = 0
let xis = NumFromString(strings!inwind1xs,0)
let yis = NumFromString(strings!inwind1ys,0)
let xos = NumFromString(strings!outwindxs,0)
```

```
let yos = NumFromString(strings!outwindys,0)
if XlengthIn Is 0 do XlengthIn = -XlengthIn
if YlengthIn Is 0 do YlengthIn = -YlengthIn
if xis Is 0 do xis = -xis
if yis Is 0 do yis = -yis
if xos Is 0 do xos = -xos
if yos Is 0 do yos = -yos //checks on size of window if files are open
if ((XlengthIn + xis) gr rasterIn>>RPART.scanLength) % (XlengthIn eq 0) do
      [ XlengthIn = rasterIn>>RPART.scanLength -xis ]
if ((YlengthIn + yis) gr rasterIn>>RPART.scanCount) % (YlengthIn eq 0) do
      [ YlengthIn = rasterIn>>RPART.scanCount -yis ]
test PixOut
   ifso [
       XlengthOut = rasterOut>>RPART.scanLength -xos
       YlengthOut = rasterOut>>RPART.scanCount -yos
   ]
   ifnot [
       XlengthOut = XlengthIn
       YlengthOut = YlengthIn
   ]

// Set both = smaller one.
test (XlengthIn Is XlengthOut)
    ifso [ XlengthOut = XlengthIn ]
    ifnot [ XlengthIn = XlengthOut ]

test (YlengthIn Is YlengthOut)
    ifso [ YlengthOut = YlengthIn ]
    ifnot [ YlengthIn = YlengthOut ]

//Write new values back into strings
StringFromNum(inwind1xl,XlengthIn,0)
StringFromNum(inwind1yl,YlengthIn,0)
StringFromNum(outwindxl,XlengthOut,0)
StringFromNum(outwindyl,YlengthOut,0)
StringFromNum(inwind1xs,xis,0)
StringFromNum(inwind1ys,yis,0)
StringFromNum(outwindxs,xos,0)
StringFromNum(outwindys,yos,0)

]

and NewMicrocode() = valof
    [
    // see if this Alto's microcode is recent enough
    // to use the Rom's version of BitBLT
    let result = (table [ #61014; #1401 ])()        // VERS instruction
    let type = result rshift 12
    let version = result & #377
    resultis version ge (type le 1 ? 24, 3)
    ]

and GetFont() = valof resultis sysFont and Expand(string,boxnumber) = valof
```

```
[
// add ".ais" if no period present
let length = string>>STRING.length
if string eq 0 % length eq 0 then resultis string
for n = 1 to length do if string>>STRING.char↑n eq $. then resultis string // expand the name
let temp = Allocate(Zone,length/2 + 3)        // enough to include ".ais"
MoveBlock(temp,string,length/2 + 1)
for n = 1 to 4 do temp>>STRING.char↑(length + n) = ".ais">>STRING.char↑n
temp>>STRING.length = length + 4
Free(Zone,string)              // Zone is a static defined elsewhere if menuOnScreen do
    [
    FillBox(menu!boxnumber,white)
    WriteBox(menu!boxnumber,temp)
    ]
resultis temp
]
```

What is claimed is:

1. A method of inverting a screened halftone image converted from an original continuous tone image to reconstruct the original continuous tone image, the converting of the original continuous tone image to the screened halftone image including comparing the greyscale pixel value of each pixel of the continuous tone image to a periodic screen pattern and designating a white spot if the greyscale pixel value is greater than the screen value and designating a black spot if the greyscale pixel value is less than the screen value comprising the steps of:
   (1) isolating a pixel of the screened halftone image with a corresponding neighborhood of surrounding pixels,
   (2) finding the maximum screen value of said periodic screen pattern that provides a white spot in said neighborhood of surrounding pixels,
   (3) finding the minimum screen value of said periodic screen pattern that provides a black spot in said neighborhood of surrounding pixels,
   (4) comparing the maximum screen value that provides a white spot to the minimum screen value that provides a black spot, and
   (5) determining that the greyscale pixel value of said pixel of the reconstructed image is approximately the average of said maximum and minimum screen values if the minimum screen value providing a black spot is greater than the maximum screen value providing a white spot.

2. The method of claim 1 including the step of severing a portion of said neighborhood of surrounding pixels, said portion excluding said pixel isolated with a corresponding neighborhood, if the minimum screen value providing a black spot is less than the maximum screen value providing a white spot.

3. The method of claim 2 wherein said portion of said neighborhood of surrounding pixels includes the spot corresponding to said minimum screen value or said maximum screen value that is furthest away from said pixel with the corresponding neighborhood.

4. The method of claim 3 wherein said neighborhood is a matrix of spots and the portions of the neighborhood that is severed includes the column and row of the matrix comprising the spot that is furthest away from said pixel.

5. The method of claim 4 including the steps of finding a second maximum screen value providing a white spot and finding a second minimum screen value providing a black spot in the corresponding neighborhood of the isolated pixel, said corresponding neighborhood excluding the severed portion of said neighborhood.

6. The method of claim 5 including the step of comparing the second maximum screen value providing a white spot with the second minimum screen value providing a black spot.

7. The method of claim 6 including the step of determining that the greyscale value of the isolated pixel of the halftone image is approximately the average of said second maximum and minimum screen values if the second minimum screen value is greater than said second maximum screen value.

8. The method of claim 7 including the step of severing a second portion of said neighborhood of surrounding pixels if the second minimum screen value is less than the second maximum screen value, said second portion excluding said pixel isolated with a corresponding neighborhood.

9. The method of claim 1 wherein the corresponding neighborhood comprises one screen cycle of spots.

10. In a process wherein a continuous tone greyscale image has been converted to a halftone image by comparing the continuous tone pixel greyscale values to a periodic screen pattern of values to convert each greyscale value to a black or white spot, the method of inverting the halftone image spots back to the continuous tone pixel greyscale values comprising the steps of:
   (1) isolating a spot of the halftone image with a corresponding neighborhood of surrounding spots,
   (2) finding the maximum and minimum screen values of the screen patterns to produce the black and white spots in the corresponding neighborhood, and
   (3) comparing these maximum and minimum screen values to invert the isolated spot back to a continuous greyscale value.

11. The method of claim 10 wherein the corresponding neighborhood comprises a matrix of spots of approximately one screen pattern cycle.

12. The method of claim 10 including the steps of finding the maximum screen value to produce a white spot and the minimum screen value to produce a black spot in the corresponding neighborhood.

13. The method of claim 12 including the step of determining that the minimum screen value to produce a black spot is greater than the maximum screen value to produce a white spot.

14. The method of claim 13 including the step of concluding that the greyscale value of the isolated spot is approximately the average of said minimum and maximum screen values.

15. The method of claim 12 including the step of determining that the minimum screen value to produce a black spot is less than the maximum screen value to produce a white spot.

16. The method of claim 15 including the step of severing a portion of the corresponding neighborhood of spots surrounding the isolated spot.

17. The method of claim 16 including the steps of finding the maximum screen values of the screen pattern to produce white spots in said reduced neighborhood of spots and finding the minimum screen value to produce a black spot.

18. The method of claim 17 including the step of determining that the minimum screen value to produce a black spot is greater than the maximum screen value to produce a white spot.

19. The method of claim 17 including the step of determining that the minimum screen value to produce a black spot is less than the maximum screen value to produce a white spot.

* * * * *